US010141735B2

(12) United States Patent
Basso et al.

(10) Patent No.: US 10,141,735 B2
(45) Date of Patent: Nov. 27, 2018

(54) POWER CONVERSION CIRCUIT WITH INDICATOR COUPLED TO INPUT TERMINAL TO SIGNAL CONDITION OF THE CONTROLLER

(71) Applicant: SEMICONDUCTOR COMPONENTS INDUSTRIES, LLC, Phoenix, AZ (US)

(72) Inventors: Christophe Basso, Pibrac (FR); Stephanie Cannenterre, Colomiers (FR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 15/193,460

(22) Filed: Jun. 27, 2016

(65) Prior Publication Data
US 2017/0373603 A1  Dec. 28, 2017

(51) Int. Cl.
*H02H 7/12* (2006.01)
*H02H 7/122* (2006.01)
*H02H 3/04* (2006.01)
*H02H 3/20* (2006.01)
*H02H 3/24* (2006.01)
*H02H 7/00* (2006.01)
*H02H 7/10* (2006.01)
*H02M 1/32* (2007.01)
*H02M 3/335* (2006.01)
*H02M 1/00* (2006.01)

(52) U.S. Cl.
CPC .......... *H02H 7/1225* (2013.01); *H02H 3/04* (2013.01); *H02H 3/20* (2013.01); *H02H 3/24* (2013.01); *H02H 7/00* (2013.01); *H02H 7/10* (2013.01); *H02H 7/12* (2013.01); *H02H 7/1222* (2013.01); *H02M 1/32* (2013.01); *H02M 3/33507* (2013.01); *H02M 2001/0022* (2013.01)

(58) Field of Classification Search
CPC ............. H02M 3/335; H02M 3/33507; H02M 3/33523; H02M 2001/0022; H02H 3/04; H02H 3/093; H02H 3/243; H02H 3/202; H02H 3/20; H02H 3/207; H02H 3/24; H02H 7/10; H02H 7/12; H02H 7/122
See application file for complete search history.

(56) References Cited

U.S. PATENT DOCUMENTS

| 3,813,667 | A | 5/1974 | Smith |
| 6,829,129 | B2 | 12/2004 | Marsh et al. |
| 7,352,157 | B2 | 4/2008 | Jabaji |

(Continued)

OTHER PUBLICATIONS

ON Semiconductor, "Low Power Offline PWM Current Mode Controller with Brown-Out Protection," NCP1256/D Data Sheet, Rev. 3, Dec. 2015, 24 pages.

*Primary Examiner* — Gary L Laxton
*Assistant Examiner* — Rafael O. De León Domenech
(74) *Attorney, Agent, or Firm* — Dickinson Wright PLLC

(57) ABSTRACT

A power conversion circuit has a controller with an input terminal and a circuit configured to drive an electric current out of the input terminal in response to a condition of the controller. An indicator is coupled to the input terminal of the controller. The controller includes a clock signal controlling the electric current out of the input terminal. The input terminal is a voltage sensing terminal or feedback input terminal in some embodiments.

12 Claims, 9 Drawing Sheets

(56) References Cited

U.S. PATENT DOCUMENTS

| | | | | |
|---|---|---|---|---|
| 7,529,105 B1* | 5/2009 | Choi | ................ | H02M 3/33523 |
| | | | | 363/131 |
| 7,623,361 B2* | 11/2009 | Basso | ................ | H02M 1/36 |
| | | | | 323/901 |
| 8,427,802 B2 | 4/2013 | Yoshizawa | | |
| 9,584,017 B1* | 2/2017 | Sundararaj | ............ | H02H 3/202 |
| 9,755,421 B2* | 9/2017 | Chang | ................ | H02H 3/20 |
| 2006/0055419 A1* | 3/2006 | Paulson | ............ | G01R 31/343 |
| | | | | 324/765.01 |
| 2006/0209581 A1* | 9/2006 | Choi | ................ | H02M 3/33523 |
| | | | | 363/120 |
| 2008/0278125 A1* | 11/2008 | Pigott | ................ | H02M 1/38 |
| | | | | 323/271 |
| 2011/0175587 A1* | 7/2011 | Hosotani | ........ | H02M 3/33515 |
| | | | | 323/283 |
| 2013/0083562 A1* | 4/2013 | Wu | ................ | H02M 1/32 |
| | | | | 363/16 |
| 2013/0215651 A1* | 8/2013 | Liao | ................ | H02M 5/40 |
| | | | | 363/34 |
| 2014/0289548 A1* | 9/2014 | Cannenterre | ........ | H02M 1/08 |
| | | | | 713/323 |
| 2015/0155704 A1* | 6/2015 | Kikuchi | ................ | H02M 1/32 |
| | | | | 363/21.12 |
| 2015/0155787 A1* | 6/2015 | Chen | ................ | H02M 3/33507 |
| | | | | 363/21.15 |

* cited by examiner

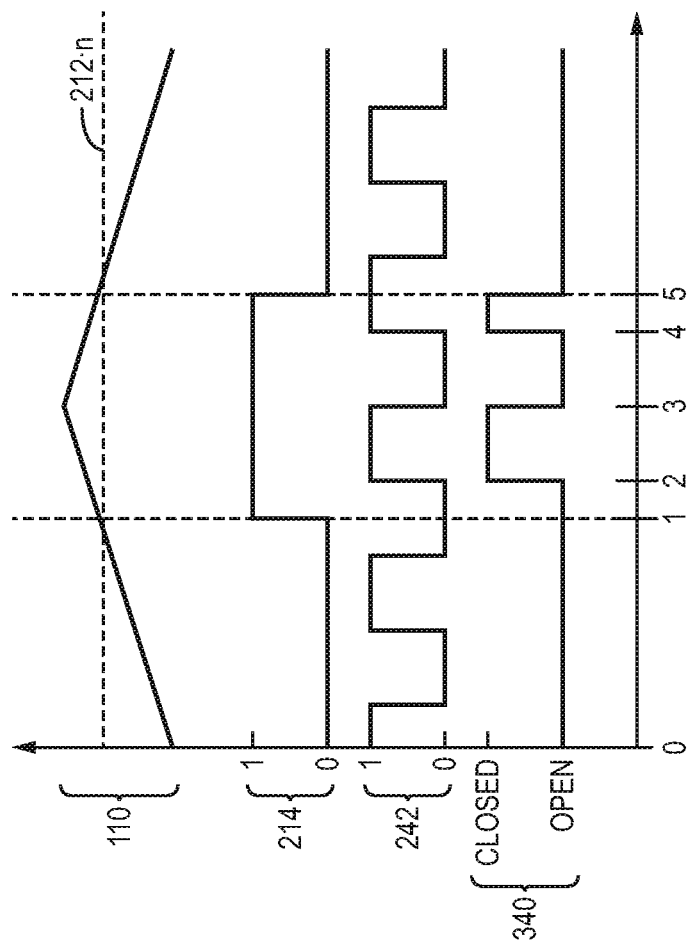

POWER CONVERSION CIRCUIT WITH INDICATOR COUPLED TO INPUT TERMINAL TO SIGNAL CONDITION OF THE CONTROLLER

BACKGROUND

Electronic devices commonly require a direct current (DC) voltage of appropriate level for proper operation. A manufacturer of an electronic device provides for a power signal to be connected to the electronic device, which is used to power the semiconductor packages and other electric components of the electronic device. In many cases, the provided power signal is at a different voltage potential than the voltage required to operate the individual components of the electronic device. The manufacturer will generally provide a power conversion circuit to generate a steady DC voltage signal at a voltage potential usable by the electronic device. Switch-mode power supplies (SMPS) are common due to efficiency advantages.

An SMPS may be located within an electronic device, or located externally and connected to the electronic device by a cable. The cable is coupled to the electronic device using a detachable plug in some embodiments. The plug may include both power and data lines, e.g., when an electronic device is a cell phone, tablet computer, or other mobile device, and power is provided by a Universal Serial Bus (USB) interface. In some embodiments, electronic devices follow the USB Power Delivery (USB-PD) protocol to negotiate a voltage potential for power delivery by an external SMPS.

An SMPS operates by switching an input power signal on and off repeatedly to create a relatively high-frequency power signal. The switched power signal is routed through a transformer or inductor, and then rectified and filtered to create a steady DC power signal. The output power signal is commonly rectified by one or more diodes, or a transistor is used for synchronous rectification.

A circuit diagram for one exemplary embodiment of a flyback SMPS 100 is illustrated in FIG. 1. SMPS 100 is formed by components disposed on a circuit board, PCB, or substrate 101. In some embodiments, SMPS 100 is split across multiple substrates 101. SMPS 100 is split into a primary side 102 and a secondary side 104, which are delineated by transformer 105. Transformer 105 includes a primary winding 106 as part of primary side 102 and a secondary winding 108 as part of secondary side 104. Primary side 102 of SMPS 100 is made up of the components electrically connected to primary winding 106. Secondary side 104 of SMPS 100 is made up of the components electrically connected to secondary winding 108. Transformer 105 provides DC isolation between primary side 102 and secondary side 104. Alternating current (AC) signals through primary winding 106 are transferred to secondary winding 108 by magnetic coupling, while any DC offset is substantially ignored.

Primary side 102 includes a power input at bulk voltage ($V_{BULK}$) node 110. In some embodiments, $V_{BULK}$ node 110 receives a rectified AC power signal provided by an electric utility at, e.g., 110 or 230 volts AC. The AC electric signal is routed to a residence, commercial office building, or other premises by power mains, and input to the electronic device including SMPS 100 by plugging the device into a wall outlet. A diode bridge or other rectifier circuit rectifies the input AC mains signal to include positive voltage values at $V_{BULK}$ node 110. In other embodiments, a power signal is provided to $V_{BULK}$ node 110 by other means, e.g., from solar cells or a battery pack. A capacitor 111 is coupled between $V_{BULK}$ node 110 and ground node 113 to further filter the input power signal. Ground node 113 operates as the ground reference voltage for the electrical components of primary side 102.

Electric current from $V_{BULK}$ node 110 through primary winding 106 to ground node 113 is turned on and off by primary MOSFET 112. Primary MOSFET 112 includes a drain terminal coupled to primary winding 106 opposite $V_{BULK}$ node 110, a gate terminal coupled to primary flyback controller 120 at circuit node 114 (DRV), and a source terminal coupled to current sense resistor 118 at current sense (CS) node 119. The source and drain terminals of primary MOSFET 112 are conduction terminals, and the gate terminal is a control terminal. Controller 120 turns on, or enables electric conduction through, primary MOSFET 112 by providing a positive voltage potential at the gate terminal of the MOSFET via DRV node 114 coupled to a drive output of the controller. In some embodiments, additional driver circuitry is coupled between controller 120 and the gate terminal of MOSFET 112. When primary MOSFET 112 is turned on, electric current flows from $V_{BULK}$ node 110 to ground node 113 through primary winding 106, primary MOSFET 112, and resistor 118 in series. Controller 120 turns off primary MOSFET 112 by outputting a ground voltage potential to the gate terminal of primary MOSFET 112. While primary MOSFET 112 is off, no significant current flows from $V_{BULK}$ node 110 through primary winding 106.

In the ideal case, an n-channel MOSFET exhibits zero resistance when its gate has a positive voltage potential, and exhibits infinite resistance when its gate is at ground potential. MOSFET 112 is an n-channel MOSFET that operates as a switch opened and closed by a control signal from controller 120 coupled to the MOSFET's gate terminal at DRV node 114. A switch, e.g., MOSFET 112, being closed is also referred to as the switch being "on," because electric current is able to flow between conduction terminals of the switch. An open switch is referred to as being "off" because current does not flow significantly between the conduction terminals of the switch. While the primary switch of SMPS 100 is illustrated as an re-channel MOSFET, other types of electronically controlled switches, e.g., bipolar-junction transistors (BJTs), p-channel MOSFETs, gallium arsenide transistors, junction gate field-effect transistor, other types of field-effect transistors (FETs), and other types of electronic switches, are used in other embodiments. FETs include source and drain terminals, which are conduction terminals, and a gate terminal as a control terminal. BJTs include emitter and collector terminals, which are conduction terminals, and a base terminal as a control terminal. Any of the switches discussed below may be implemented as MOSFETs, BJTs, or another type of electronic switch.

Controller 120 determines when to switch primary MOSFET 112 by observing the magnitude of current through primary winding 106. Resistor 118 creates a voltage potential difference between ground node 113 and CS node 119 when electric current flows through the resistor. The voltage potential across resistor 118, as observed at CS node 119, is approximately proportional to the current through primary winding 106. CS node 119 is coupled to a current sense input pin of controller 120. Controller 120 observes the voltage potential at CS node 119 to determine the electric current magnitude through primary winding 106.

While controller 120 has primary MOSFET 112 turned on, electric current through primary winding 106 increases approximately linearly and magnetizes transformer 105.

When controller 120 turns off primary MOSFET 112, electric current through primary winding 106 is substantially stopped. The magnetic energy stored in transformer 105 while MOSFET 112 is on is output as electric current through secondary winding 108 while MOSFET 112 is off, creating a positive voltage potential at voltage output ($V_{OUT}$) node 124 relative to ground node 126. Ground node 126 operates as the ground reference voltage for electrical components of secondary side 104. SMPS 100 is an isolated topology, meaning a separate primary side ground node 113 and secondary side ground node 126 are used. The voltage potential of ground node 126 is allowed to float relative to ground node 113.

The voltage potential at $V_{OUT}$ node 124 charges capacitor 128 and powers additional circuit components of an electronic device connected to SMPS 100 as a load. The cycle repeats when controller 120 turns on primary MOSFET 112 to again magnetize transformer 105. Capacitor 128 provides power to $V_{OUT}$ node 124 while primary MOSFET 112 is on, and transformer 105 is being magnetized. Diode 130 rectifies current through secondary winding 108 by reducing electric current flowing from $V_{OUT}$ node 124 to ground node 126 through secondary winding 108 while transformer 105 is being magnetized from primary side 102.

Feedback is provided from secondary side 104 to primary side 102 by Zener diode 154 and optocoupler 155. Optocoupler 155 includes a light-emitting diode (LED) 156 and a phototransistor 158. If the voltage potential at $V_{OUT}$ node 124 exceeds the Zener voltage of Zener diode 154 summed with the voltage drop of LED 156, current flows from $V_{OUT}$ node 124 to ground node 126 through Zener diode 154 and LED 156 in series. Photons emitted by LED 156 hit phototransistor 158, which turns on the phototransistor and increases the coupling of feedback (FB) node 160 to ground node 113. FB node 160 is coupled to a feedback input pin or terminal of controller 120. Capacitor 159 filters the voltage potential at FB node 160. As current through LED 156 increases, the coupling of FB node 160 to ground node 113 through phototransistor 158 is increased, and the voltage potential of FB node 160 is further reduced.

As controller 120 observes voltage potential at FB node 160 being reduced, the controller understands that voltage potential at $V_{OUT}$ node 124 is at or above a desired output voltage potential. Controller 120 takes measures as configured to reduce power transfer from primary side 102 to secondary side 104, e.g., reducing on-time of MOSFET 112 or modifying the switching frequency of DRV signal 114.

Controller 120 also includes a brown-out input coupled to brown-out (BO) node 170. BO node 170 is coupled to $V_{BULK}$ node 110 using resistors 172 and 174 as a voltage divider. Resistors 172 and 174 operate to reduce the voltage potential from $V_{BULK}$ node 110 to BO node 170 for input to controller 120. Controller 120 compares the voltage potential at BO node 170 against internal reference voltage thresholds to determine if an over-voltage or brown-out condition exists. An over-voltage condition exists when the voltage potential at $V_{BULK}$ node 110 increases above acceptable levels. A brown-out condition exists when the voltage potential at $V_{BULK}$ node 110 falls below acceptable levels. The lower voltage at $V_{BULK}$ node 110 during brown-out results in an increased electric current magnitude input to SMPS 100 to maintain the voltage potential at $V_{OUT}$ node 124. The increased input current potentially overheats and damages components of SMPS 100.

Manufacturers desire to create controllers for switch-mode power supplies that are able to output an indication when over-voltage, brown-out, or other types of conditions are present. However, adding additional output pins for connecting an LED, speaker, buzzer, or other indication mechanism to controller 120 is undesirable because the change in form-factor increases the design footprint of the controller and reduces compatibility with existing designs.

BRIEF DESCRIPTION OF THE DRAWINGS

FIGS. 3a-3c illustrate output of an indication via a feedback pin of a power supply controller.

DETAILED DESCRIPTION OF THE DRAWINGS

The following describes one or more embodiments with reference to the figures, in which like numerals represent the same or similar elements. While the figures are described in terms of the best mode for achieving certain objectives, the description is intended to cover alternatives, modifications, and equivalents as may be included within the spirit and scope of the disclosure.

Figure 1:
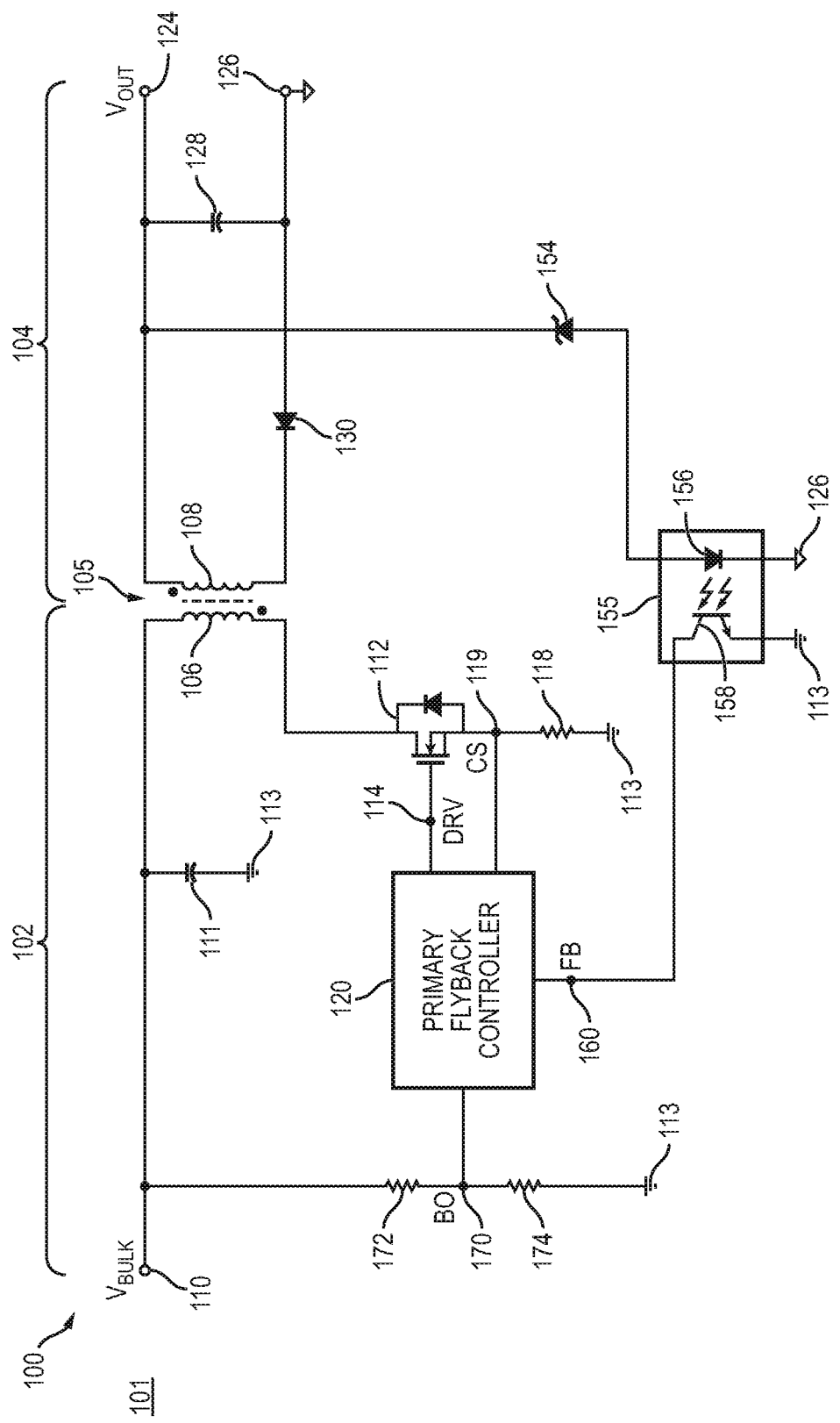
FIG. 1 illustrates an exemplary circuit diagram of a flyback converter.
Figure 2A:
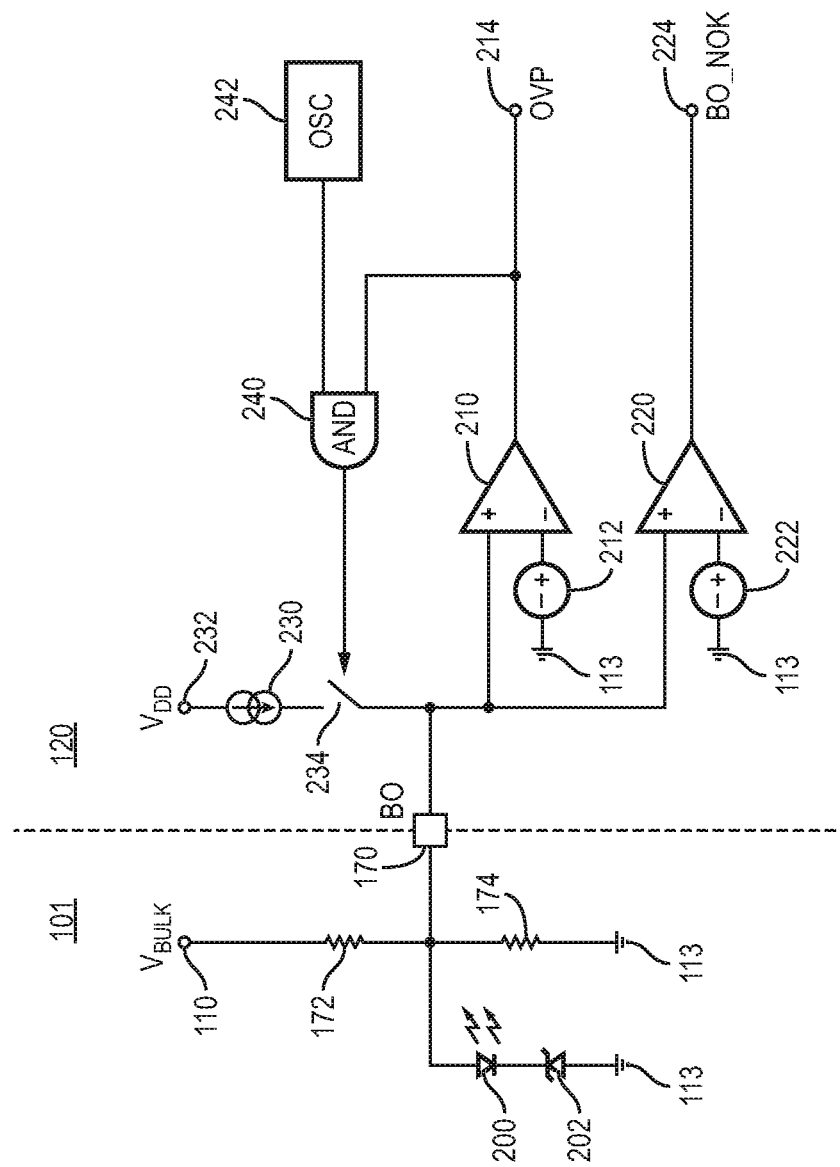
FIGS. 2a-2d illustrate output of an indication via a brown-out pin of a power supply controller.

FIG. 2a illustrates a portion of controller 120 having a BO pin or terminal 170 connected to the voltage divider of resistors 172 and 174. The dotted line through BO pin 170 delineates between components of controller 120 on the right side of BO pin 170 and components disposed on substrate 101 adjacent to the controller on the left side of BO pin 170. LED 200 is coupled to BO pin 170 as an indicator output of controller 120. LED 200 is coupled between BO pin 170 and ground node 113 in series with Zener diode 202. LED 200 includes an anode connected to BO pin 170 and a cathode connected to a cathode of Zener diode 202. Zener diode 202 includes an anode coupled to ground node 113.

Under normal operating conditions, current flows from $V_{BULK}$ node 110 to ground node 113 through resistors 172 and 174, generating a voltage potential at BO pin 170 proportional to the voltage potential of $V_{BULK}$ node 110. Comparator 210 compares the voltage potential of BO pin 170 against an over-voltage protection (OVP) voltage threshold 212. Comparator 210 asserts OVP signal 214 when the voltage potential of BO node 170 exceeds OVP threshold 212. OVP signal 214 is routed to other portions of controller 120 that react to the over-voltage condition by, e.g., disabling switching of MOSFET 112. OVP signal 214 is output as a logic zero value when the voltage potential of BO pin 170 is below the voltage potential of OVP threshold 212 to indicate that no over-voltage condition exists. OVP signal 214 is output as a logic one value when the voltage potential of BO pin 170 is above the voltage potential of OVP threshold 212, indicating that the voltage potential of $V_{BULK}$ node 110 is over acceptable limits. In some embodiments, a low-pass filter is coupled to the output of comparator 210 as a noise delay to filter noise at OVP signal 214.

Comparator 220 compares the voltage potential of BO pin 170 against BO threshold voltage 222. When the voltage potential at $V_{BULK}$ node 110 falls sufficiently that BO pin 170 is below BO threshold 222, the current draw of SMPS 100 to maintain the voltage potential of $V_{OUT}$ node 124 is above acceptable limits. BO_NOK signal 224 is asserted to indicate to other portions of controller 120 that a brown-out condition exists. Controller 120 ceases switching of MOSFET 112, or takes other measures as configured, to handle the brown-out condition.

BO_NOK signal 224 is active-low because the normal state of BO pin 170 is a greater voltage potential than BO threshold 222. A logic one value at BO_NOK signal 224 indicates that BO pin 170 is at a higher voltage potential than BO threshold 222, and no brown-out condition exists. A logic zero value at BO_NOK signal 224 indicates that BO pin 170 is at a lower voltage potential than BO threshold 222, and a brown-out condition exists. In one embodiment, a low-pass filter is coupled to the output of comparator 220 as a noise delay to filter noise at BO_NOK signal 224. In some embodiments, a leading-edge blanking module is coupled to the output of comparator 220 for generating BO_NOK signal 224.

Under normal operation of SMPS 100, the voltage potential at BO pin 170 is below the Zener voltage of Zener diode 202, and current does not flow through LED 200. LED 200 is off during normal operation because the voltage potential of BO pin 170 is maintained below a threshold to enable electric current through LED 200 and Zener diode 202. Zener diode 202 operates to create a minimum threshold voltage of BO node 170 for turning on LED 200. In another embodiment, two green LEDs 200 are coupled in series without Zener diode 202. The two green LEDs 200 have a turn-on voltage of approximately 4 volts. With brown-out threshold 222 at approximately 0.8 volts and OVP threshold 212 at approximately 3 volts, the 4 volt threshold for turning on two LEDs 200 in series is sufficiently above the voltage of BO node 170 during normal operation without the need for Zener diode 202. Generally, any number of LEDs or diodes, or other circuit elements, may be used in other embodiments to increase the turn-on voltage of an indicator to at least the voltage potential of OVP threshold 212.

Controller 120 includes a current source 230 coupled between $V_{DD}$ node 232 and BO pin 170 that is configured to drive electric current out of controller 120 at BO pin 170 when switch 234 is closed, i.e., turned on. Switch 234 is a field-effect transistor, BJT, or other electronic switch formed as part of controller 120 in various embodiments. Closing switch 234 connects current source 230 to BO pin 170 to bias the BO pin. LED 200 is turned on by current source 230 injecting electric current from BO pin 170 through LED 200 and Zener diode 202. LED 200 is turned on and emits light when switch 234 is closed. LED 200 is off and does not emit light when switch 234 is open because the voltage divider of resistors 172 and 174 is configured to maintain BO pin 170 below the Zener voltage of Zener diode 202 for the expected range of $V_{BULK}$ node 110 voltages.

Switch 234 is controlled by an output of AND gate 240. An AND gate outputs a logic one value if both inputs of the AND gate are logic one values. An AND gate outputs a logic zero value if only one input of the AND gate is a logic one value, and also outputs a logic zero value if both inputs are a logic zero value. AND gate 240 receives OVP signal 214 and a square wave from oscillator 242 as inputs. Under normal operation of SMPS 100, OVP signal 214 is a logic zero, which maintains the output of AND gate 240 at a logic zero. No matter what logical value is input to AND gate 240 from oscillator 242, both inputs to AND gate 240 will not be logic one values because OVP signal 214 is a logic zero value. Switch 234 is open and LED 200 is off. When the voltage potential of $V_{BULK}$ node 110 increases, and BO pin 170 exceeds OVP threshold 212, OVP signal 214 is asserted to AND gate 240.

With OVP signal 214 to AND Gate 240 asserted, the output of AND gate 240 is controlled by oscillator 242. When oscillator 242 outputs a logic zero value, both inputs to AND gate 240 are not logic one, so the AND gate outputs a logic zero. When oscillator 242 outputs a logic one value while OVP signal 214 is a logic one, both inputs to AND gate 240 are a logic one value. A logic one value is therefore output by AND gate 240. Oscillator 242 alternates the output to AND gate 240 between a logic one and logic zero value, e.g., with a 25 Hertz or lower square wave. AND gate 240 outputs a signal similar to the output of oscillator 242 while OVP signal 214 is a logic one value. AND gate 240 outputs a logic one value while oscillator 242 outputs a logic one value and OVP signal 214 is at a logic one. Switch 234 is closed, and current flows through LED 200 as a visible over-voltage indicator.

AND gate 240 closing switch 234 to inject current from current source 230 through LED 200 raises the voltage potential of BO pin 170. While switch 234 is closed, the voltage potential of BO pin 170 is held above OVP threshold 212 by current source 230 even if the over-voltage condition at $V_{BULK}$ node 110 is resolved. Even if the voltage potential of $V_{BULK}$ node 110 is subsequently reduced to within acceptable levels, switch 234 being closed biases the voltage potential at BO pin 170 to over OVP threshold 212, and OVP signal 214 remains high.

However, oscillator 242 outputs a logic zero value periodically to open switch 234. During the periods when switch 234 is open, the voltage potential at BO pin 170 returns to being proportional to the voltage potential of $V_{BULK}$ node 110 because current source 230 is disconnected from BO pin 170. If the voltage potential at $V_{BULK}$ node 110 is reduced such that an over-voltage condition no longer exists, comparator 210 will transition OVP signal 214 to a logic zero during the time period when oscillator 242 outputs a logic zero. When oscillator 242 transitions to a logic one again, OVP signal 214 is a logic zero, so AND gate 240 does not close switch 234 to reconnect current source 230.

LED 200 in FIG. 2a blinks along with the signal output from oscillator 242 when an over-voltage condition exists at $V_{BULK}$ node 110. When LED 200 is on, electric current from current source 230 raises the voltage potential of BO pin 170 to above OVP threshold 212. When LED 200 is off, the voltage potential of BO pin 170 is reduced to allow comparator 210 to detect whether the over-voltage condition remains.

Figure 2B:
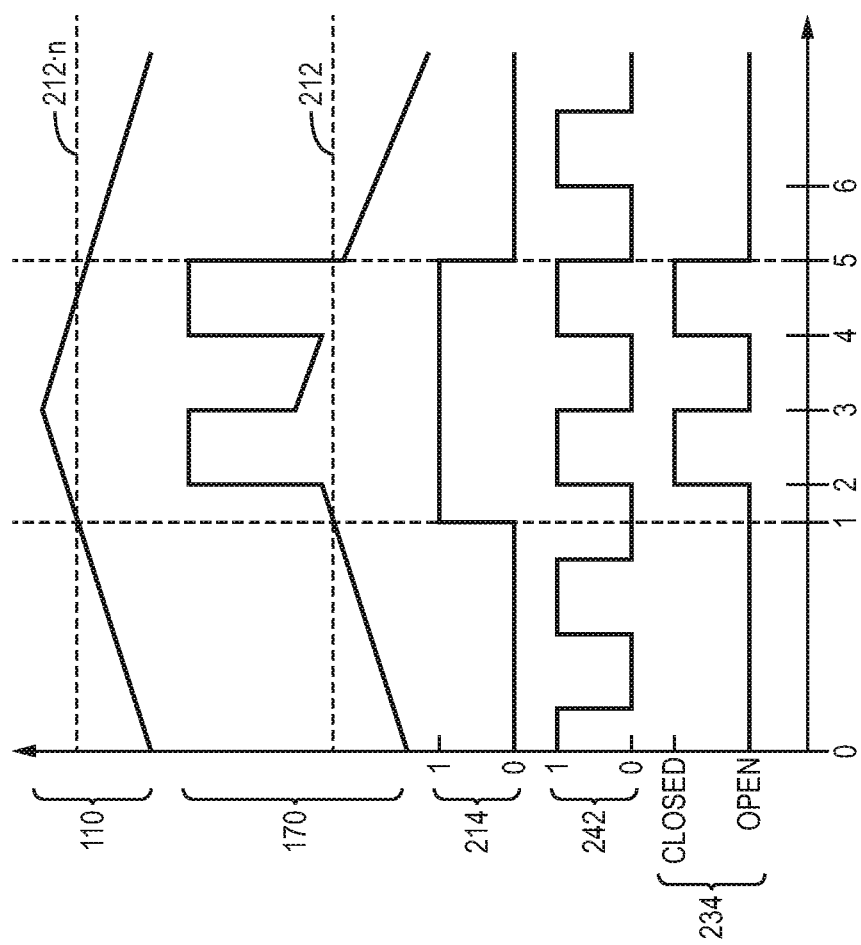

FIG. 2b illustrates a timing diagram of controller 120 entering and exiting an over-voltage condition with LED 200 coupled to BO pin 170 as in FIG. 2a. The horizontal, or X, axis in FIG. 2b illustrates passage of time. Time is labelled for convenience in discussing the state of controller 120 rather than in fixed units of time. The vertical, or Y, axis in FIG. 2b illustrates logical values, states, or voltage potentials of various circuit nodes and components in FIG. 2a.

A voltage potential of $V_{BULK}$ node 110 is illustrated rising from time zero to time 3, and then falling from time 3 to time 6. A threshold for $V_{BULK}$ node 110 being in an over-voltage condition is overlaid over the $V_{BULK}$ node 110 signal plot. The threshold for over-voltage detection is equivalent to OVP threshold 212 multiplied by n, where n depends on the resistance values of resistors 172 and 174. BO pin 170 is illustrated rising and falling along with $V_{BULK}$ node 110, with the voltage potential of OVP threshold 212 overlaid. At time 1, $V_{BULK}$ node 110 rises sufficiently for BO pin 170 to exceed OVP threshold 212. Comparator 210 asserts OVP signal 214 beginning at time 1 due to the comparison of BO pin 170 greater than OVP threshold 212.

When OVP signal 214 is asserted at time 1, the oscillator 242 output is a logic zero, so AND gate 240 does not immediately close switch 234. The oscillator 242 output is illustrated as a square wave with a rising edge at time 2 in FIG. 2b. When oscillator 242 outputs a logic one value beginning at time 2, both the OVP signal 214 and oscillator 242 inputs to AND gate 240 are logic one values. Therefore, switch 234 is closed beginning at time 2. With switch 234 closed, electric current from current source 230 is injected through LED 200 to turn the LED on. As illustrated in FIG. 2b, the voltage potential at BO pin 170 is increased significantly beginning at time 2 by the connection of current source 230 through switch 234.

From time 2 to time 3, BO pin 170 is held significantly above the voltage potential of OVP threshold 212, and OVP signal 214 remains asserted even if $V_{BULK}$ node 110 falls below the over-current threshold. At time 3, the oscillator 242 output to AND gate 240 becomes a logic zero value, and switch 234 is opened. With switch 234 open from time 3 to time 4, BO pin 170 is again at a voltage potential proportional to $V_{BULK}$ node 110. However, $V_{BULK}$ node 110 in FIG. 2b does not fall sufficiently before time 4 for BO pin 170 to be below OVP threshold 212.

At time 4, oscillator 242 again outputs a logic one value. AND gate 240 outputs a logic one again because OVP signal 214 remains high at time 4. AND gate 240 outputting a logic one closes switch 234, raises the voltage potential at BO pin 170, and turns on LED 200. Between times 4 and 5, the voltage potential of $V_{BULK}$ node 110 falls below the over-voltage threshold. However, with current source 230 coupled to BO pin 170 through switch 234, the voltage potential of BO pin 170 remains significantly over the voltage potential of OVP threshold 212. Both inputs to AND gate 240 remain at logic one values because oscillator 242 is high and current source 230 drives BO pin 170 over OVP threshold 212. LED 200 remains on from time 4 to time 5 even though the voltage potential of $V_{BULK}$ node 110 is no longer in an over-voltage condition.

At time 5, the output of oscillator 242 transitions from a logic one to a logic zero, and both inputs to AND gate 240 are no longer asserted. Switch 234 is opened and BO pin 170 returns to a value proportional to $V_{BULK}$ node 110. Because $V_{BULK}$ node 110 fell below over-voltage prior to time 5, BO pin 170 falls below OVP threshold 212 once switch 234 is opened at time 5. OVP signal 214 is de-asserted by comparator 210. When oscillator 242 returns to a logic one again at time 6, switch 234 remains open because only the oscillator input of AND gate 240 is a logic one. LED 200 is not turned on at time 6 because OVP signal 214 is a logic zero, and switch 234 remains open. Controller 120 recovers from the over-voltage condition as configured, e.g., by resuming normal operation.

Figure 2C:
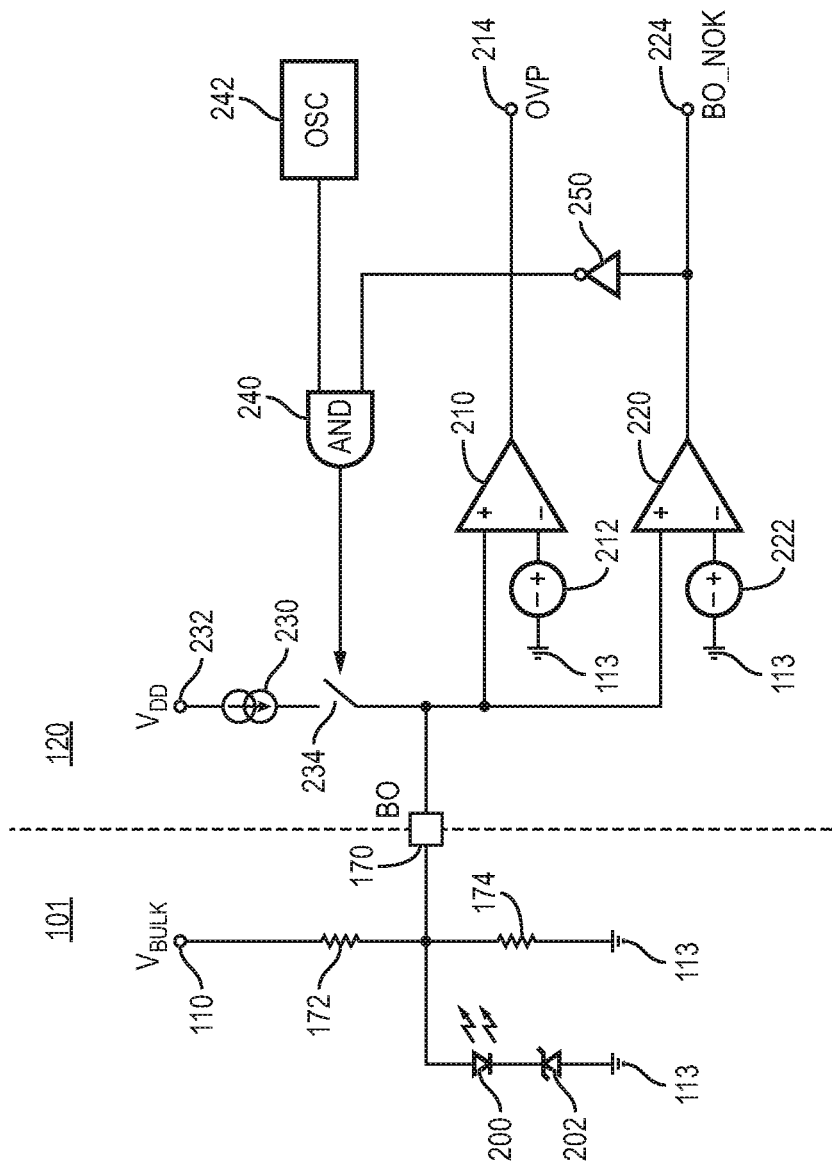

FIG. 2c illustrates BO_NOK signal 224 coupled to AND gate 240 through inverter 250, rather than OVP signal 214 being coupled to AND gate 240. Inverter 250 is used because BO_NOK signal 224 is active-low, but AND gate 240 is activated by a logic one input. Switch 234 is closed, turning on LED 200, when the voltage potential of BO pin 170 falls below the voltage potential of BO threshold 222. Turning on LED 200 raises the voltage potential of BO pin 170 above BO threshold 222, and comparator 220 de-asserts BO_NOK signal 224. In some embodiments, a latch or flip-flop is used to extend the on-time of LED 200 for the length of time that oscillator 242 outputs a logic one, or another desirable length of time. LED 200 in FIG. 2c is used as a visible indication of a brown-out condition, while LED 200 in FIG. 2a is used as a visible indication of an over-voltage condition.

Figure 2D:
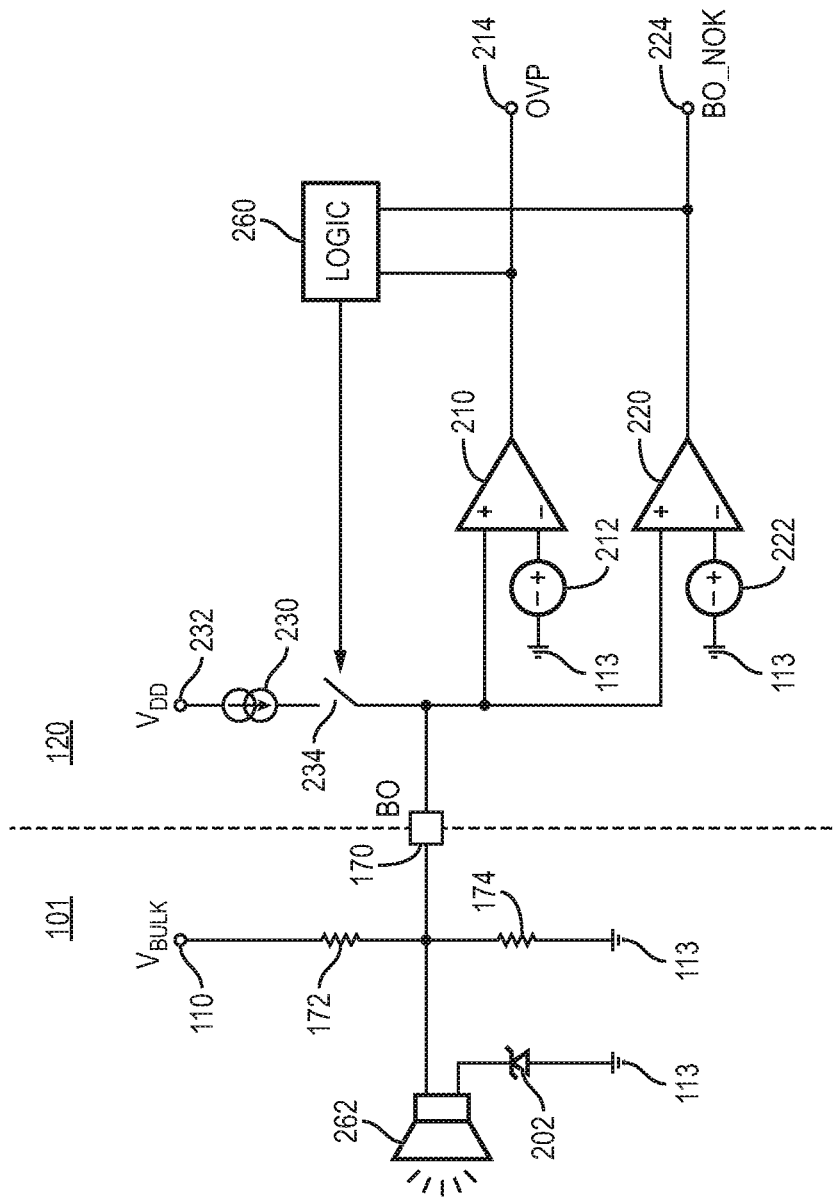

In FIG. 2d, both OVP signal 214 and BO_NOK signal 224 are input to logic block 260. Logic block 260 has an output coupled to control switch 234. In addition, LED 200 is replaced by speaker or buzzer 262. Buzzer 262 is an audible indicator rather than the visible indicator of LED 200. However, either buzzer 262, LED 200, both, or another indication mechanism may be used as the indicator with any of the disclosed indicator output circuits.

Logic block 260 represents combinational or sequential logic configured to control switch 234 based on OVP signal 214 and BO_NOK signal 224 to generate an audible signal pattern, or visible signal pattern when LED 200 is used. In some embodiments, logic block 260 outputs a different pattern depending on which signal, OVP signal 214 or BO_NOK 224, is asserted. For example, one beep every two seconds could be used for an over-voltage condition, with two beeps every two seconds for a brown-out condition. Different lengths of beeps or other forms of communication through audible beep patterns are used in other embodiments. Similar patterns are generated visibly using LED 200 with logic block 260.

Figure 3A:
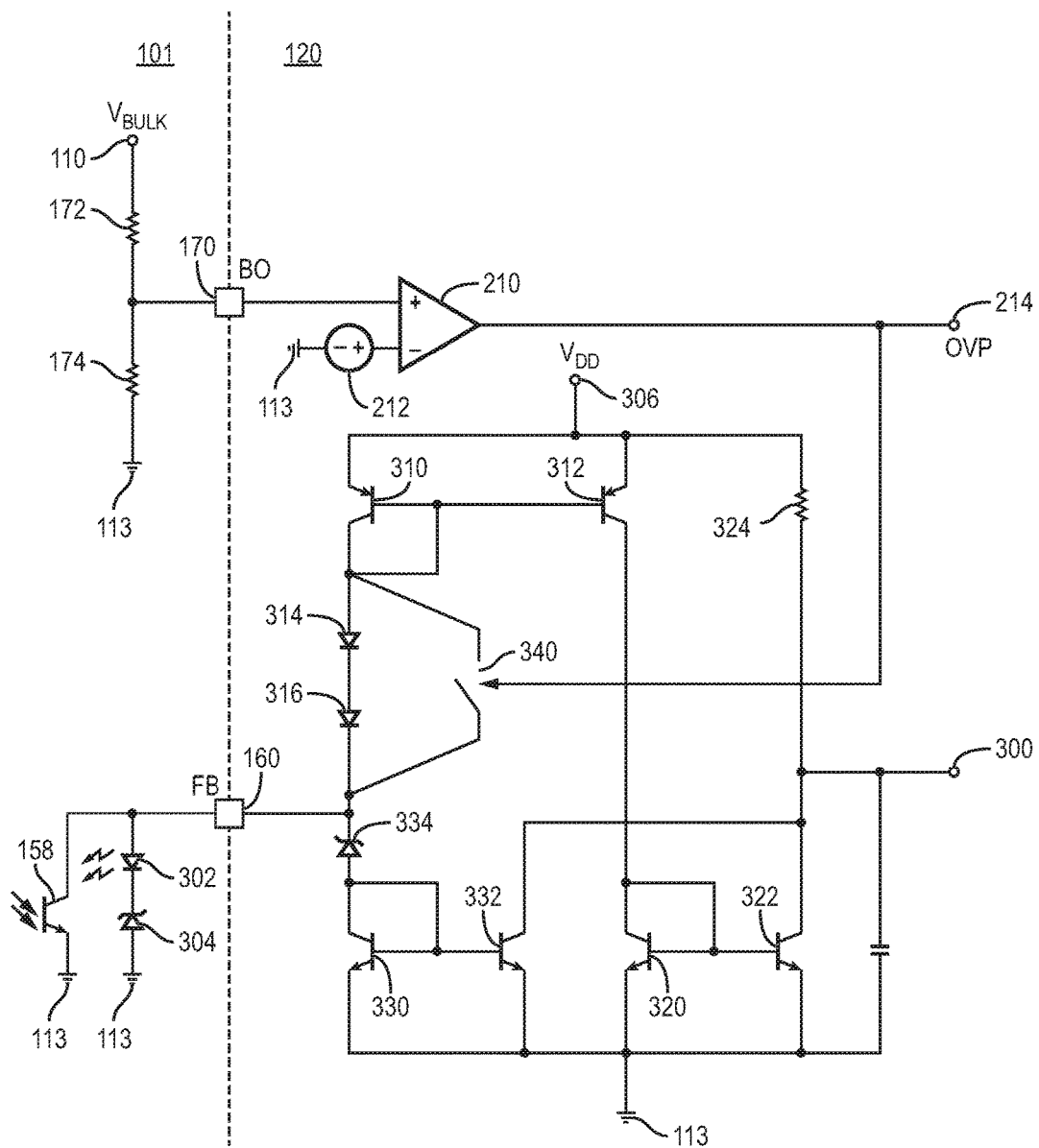

FIG. 3a illustrates an embodiment with FB pin 160 of controller 120 used to output an audible or visible indication of a brown-out or over-voltage condition. A feedback circuit of controller 120 includes a first current mirror formed by BJT 310 and BJT 312, a second current mirror formed by BJT 320 and BJT 322, and a third current mirror formed by BJT 330 and BJT 332. The feedback circuit is coupled between $V_{DD}$ node 306 and ground node 113. $V_{DD}$ node 306 represents an auxiliary power source coupled to a voltage input terminal of controller 120. The feedback circuit operates by generating a linear voltage at internal FB pin 300 when electric current is drawn from or injected into FB pin 160 of controller 120.

Diodes 314 and 316 are connected in circuit between BJT 310 and FB pin 160 under normal operation because switch 340 is open. Electric current drawn from FB pin 160 flows from $V_{DD}$ node 306 through BJT 310, diode 314, and diode 316. A similar current flows through BJT 312 and turns on BJT 320. Another similar current flows through BJT 322 and resistor 324 to generate a voltage potential at internal FB pin 300 that is below the potential of $V_{DD}$ node 306 by an amount proportional to the current drawn from FB pin 160. When current is injected into controller 120 at FB pin 160 as the feedback mechanism, the current flows through Zener diode 334 and BJT 330 to ground node 113. A similar current flows through BJT 332 and resistor 324 to reduce internal FB pin 300 by a voltage potential proportional to the current injected into FB pin 160.

LED 302 and Zener diode 304 are coupled in series between FB pin 160 and ground node 113. Under normal operation, either with a feedback mechanism injecting current into FB pin 160 or drawing current from FB pin 160, the voltage potential at FB pin 160 is below the Zener voltage of Zener diode 304. Switch 340 is open to keep diodes 314 and 316 connected in series between FB pin 160 and BJT 310. With current drawn from FB pin 160, the voltage potential at FB pin 160 is below the voltage potential of $V_{DD}$ node 306 by approximately the voltage drops across BJT 310, diode 314, and diode 316 in combination. When a feedback mechanism injects current into FB pin 160, the voltage potential of FB pin 160 is at approximately the voltage potential of Zener diode 334 summed with the voltage potential across BJT 330. No significant current flows through LED 302 because the voltage potential of FB pin 160 is below the Zener voltage of Zener diode 304 in either case, and LED 302 does not emit an appreciable amount of light during normal use.

On the other hand, while an over-voltage condition exists at $V_{BULK}$ node 110, OVP signal 214 is asserted to close switch 340. Switch 340 closing provides a route for electric current around diodes 314 and 316. With switch 340 closed, the voltage potential of FB pin 160 is raised to the voltage potential of $V_{DD}$ node 306 minus the voltage drop across BJT 310. Closing switch 340 raises the voltage potential of FB pin 160 above the turn-on voltage of LED 302 plus the Zener voltage of Zener diode 304. Electric current flows through LED 302, and the LED emits a light signal.

Because FB pin 160 is not an input used to determine whether an over-voltage or brown-out condition persists, oscillator 242 to periodically turn off the LED 302 is not used in the embodiment illustrated in FIG. 3a. LED 302 is turned on constantly while OVP signal 214 is asserted, and the LED is properly cleared when the over-current condition is removed. However, in some embodiments, an oscillator or other pattern generator is used to light up LED 302 in a desired pattern. In one embodiment, logic block 260 is used to turn on LED 302 in any desired pattern, and to provide different patterns for different conditions of controller 120. LED 302 is replaced with buzzer 262 in another embodiment. Any other circuit element that is capable of generating an indication from electric current is used in place of LED 302 in other embodiments.

While one specific feedback circuit embodiment is illustrated, other feedback circuits of a power supply controller are used with switch 340 turning on LED 302 in other embodiments. For any given feedback circuit, the circuit is configured to include a voltage at the feedback terminal of the controller that remains below the Zener voltage of Zener diode 304 plus the turn-on voltage of LED 302 under normal operation, and a voltage potential over the Zener voltage of Zener diode 304 plus the turn-on voltage of LED 302 to turn on the LED.

Figure 3B:
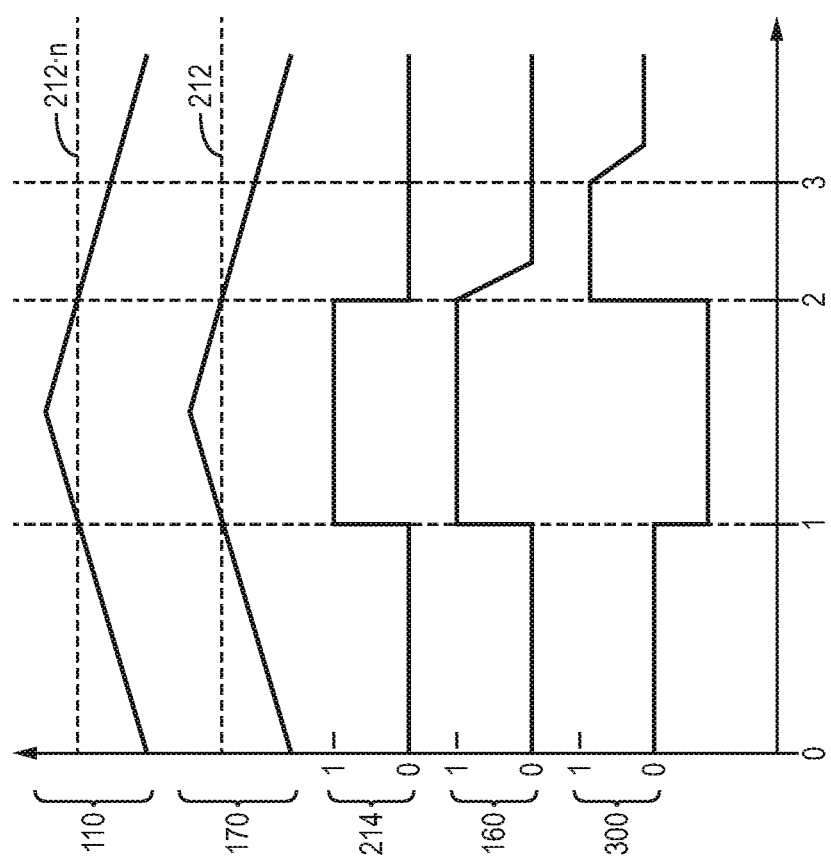

FIG. 3b illustrates timing diagrams of various signals of controller 120 in FIG. 3a as $V_{BULK}$ node 110 increases above an over-voltage threshold, and then is reduced below the threshold. $V_{BULK}$ node 110 is illustrated in FIG. 3b with the over-voltage threshold indicated as the voltage potential of OVP threshold 212 increased by a factor of n. The factor n is determined by the values of resistors 172 and 174. $V_{BULK}$ node 110 rises above the over-voltage threshold at time 1, and comparator 210 asserts OVP signal 214. OVP signal 214 at a logic one value closes switch 340, which raises the voltage potential at FB pin 160 at approximately time 1 to turn on LED 302. The current through LED 302 and Zener diode 304 is mirrored through the feedback circuit to resistor 324, which lowers the voltage potential at internal FB pin 300.

Switch 340 remains closed, and LED 302 turned on, until time 2 when the voltage potential at $V_{BULK}$ node 110 falls back below the over-voltage threshold. OVP signal 214 returns to a logic zero value once $V_{BULK}$ node 110 falls under the over-current threshold at time 2, which opens switch 340. The voltage potential at internal FB pin 300 rises to near a maximum value at time 2 because the voltage potential at $V_{OUT}$ node 124 decayed significantly while MOSFET 112 was disabled during the over-current condition. The voltage potential at FB pin 160 falls after time 2 as current discharges the voltage at FB pin 160. The voltage potential at internal FB pin 300 falls to a normal value after time 3 when the voltage potential of $V_{OUT}$ node 124 recovers to a desired level. BO pin 170 remains at a voltage potential approximately proportional to $V_{BULK}$ node 110 throughout the graph of FIG. 3b because BO pin 170 is not used as an indicator output as in FIGS. 2a-2d.

FIG. 3c illustrates switch 340 controlled by AND gate 240 and oscillator 242 from FIG. 2a. OVP signal 214 is asserted from time 1 to time 5 in FIG. 3c, while $V_{BULK}$ node 110 exceeds the over-voltage threshold. Switch 340 is open, and LED 302 is off, if either of OVP signal 214 or oscillator 242 are a logic zero value. Switch 340 is closed if both OVP signal 214 and oscillator 242 are a logic one value. Oscillator 242 transitioning high at time 2 causes the output of AND gate 240 to assert, which closes switch 340 and turns on LED 302. Oscillator 242 transitions to a logic zero at time 3, turning off LED 302, and transitions back to a logic one at time 4, which turns on LED 302. At time 5, $V_{BULK}$ node 110 falls below the over-current threshold, and OVP signal 214 transitions to a logic zero value. Switch 340 is opened at approximately time 5 because both inputs of AND gate 240 are no longer logic one values.

LED 302 is off when switch 340 is open, because the voltage potential of FB pin 160 is below the turn-on voltage of LED 302 and the Zener voltage of Zener diode 304 combined. LED 302 is on when switch 340 is closed, because switch 340 routes electricity around diodes 314 and 316 to raise the voltage potential of FB pin 160 above the turn-on voltage of LED 302 and the Zener voltage of Zener diode 304 combined. Switch 340 is opened and closed in any desired pattern to output any desired signal pattern from LED 302, buzzer 262, or another indicator mechanism.

Figure 4:
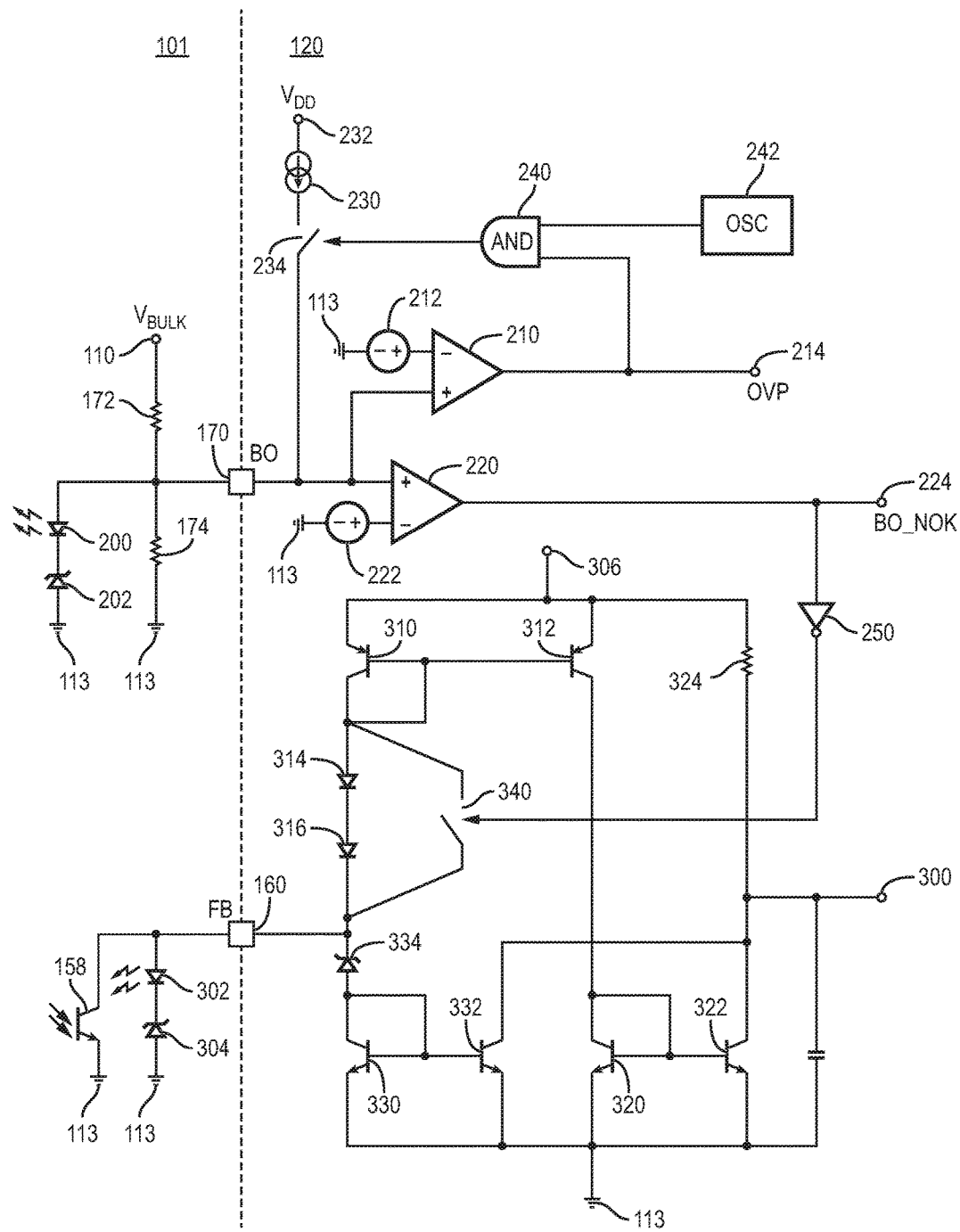
FIG. 4 illustrates using both the brown-out pin and feedback pin as indicator outputs.

FIG. 4 illustrates an embodiment with both BO pin 170 and FB pin 160 of controller 120 used to output a visible indication. OVP signal 214 controls switch 234 through AND gate 240. Assertion of OVP signal 214 closes switch 234 when the oscillator 242 output is also a logic one value to turn on LED 200. BO_NOK signal 224 controls switch 340 through inverter 250, because the BO_NOK signal is active-low. BO_NOK signal 224 closes switch 340 when the BO_NOK signal is a logic zero value to turn on LED 302. Substrate 101 includes LED 200 that lights up to indicate an over-voltage condition, and LED 302 that lights up to indicate a brown-out condition. In some embodiments, LED 200 and LED 302 are packaged together as a bi-color LED. In other embodiments, buzzer 262 is used as the over-voltage indicator, brown-out indicator, or both, instead of LEDs.

Controller 120 is capable of outputting an indication through BO pin 170, FB pin 160, or both pins of controller 120. The indicator outputs convey a message by simply lighting an LED, blinking an LED in a predetermined pattern, or by blinking the LED in any other understandable pattern, e.g., Morse code or a binary serial communication protocol. While indications for brown-out or over-voltage conditions are illustrated in the figures, other conditions are communicable in other embodiments using the disclosed indication mechanisms. The indicators can be visible by utilizing an LED or audible by utilizing a speaker or buzzer. Other indication means are used in other embodiments to generate any human perceivable signal as an indicator.

Controller 120 outputs an indication through package terminals that are used during normal operation of SMPS 100. FB pin 160 is normally used to determine an amount of power to be transferred from primary side 102 to secondary side 104 each power cycle. However, during a brown-out or over-voltage condition, switching of MOSFET 112 is disabled and FB pin 160 is not utilized for its normal purpose. Instead, controller 120 utilizes FB pin 160 as an indicator output.

Similarly, BO pin 170 is used as an input to controller 120 during normal operation to determine if $V_{BULK}$ node 110 is within an acceptable range. Oscillator 242 allows alternating between utilizing BO pin 170 for the normal use of detecting the voltage potential of $V_{BULK}$ node 110, and using BO pin 170 to turn on LED 200 as an indicator. BO pin 170 and FB pin 160 are terminals normally found on controllers for switch-mode power supplies. However, the novel circuitry of controller 120 allows a new use for these existing terminals—generating an audible or visible indicator of a status of the controller. Controller 120 reports a status externally without a dedicated pin to connect an LED or other signaling device.

While use with an isolated flyback converter is illustrated, controllers with output indicators connected to input pins are used with other types of power converter circuits in other embodiments, e.g., buck converters, boost converters, resonant mode converters, and other power supply topologies.

While one or more embodiments have been illustrated and described in detail, the skilled artisan will appreciate that modifications and adaptations to those embodiments may be made without departing from the scope of the present disclosure.

What is claimed is:

1. A power conversion circuit for converting an input voltage received from a power source to a regulated output voltage, comprising: a controller comprising; a brownout terminal; a first circuit having an input coupled to the brownout terminal, and the first circuit configured to sense a voltage on the brownout terminal while refraining from driving an alarm current to the brownout terminal; assert an internal signal if the voltage sensed on the brownout terminal during the refraining falls outside a predetermined range; and drive the alarm current to the brownout terminal responsive to the assertion of the internal signal; an external indicator coupled to the brownout terminal of the controller, the external indicator being at least one selected form a group comprising; a light emitting diode; and a buzzer configured to produce sound audible to a human.

2. The power conversion circuit of claim 1, wherein the first circuit further comprises: a logic circuit defining a first input, a second input, an output, the first input coupled to a clock signal; a current source defining a current output; an electrically controlled switch defining a control input, the electrically controlled switch coupled between the current output of the current source and the brownout terminal, and the control input coupled to the output of the logic circuit; and a comparator defining a first input, a second input and a comparator output, the first input of the comparator coupled to a reference voltage, the second input of the comparator coupled to the brownout terminal, and the comparator output coupled to the second input of the logic circuit; wherein the controller senses the voltage the electrically controlled switch is nonconductive, and when the controller drives the alarm current the electrically controlled switch is conductive.

3. The power conversion circuit of claim 1, wherein the first circuit further comprises: a first comparator defining a first input, a second input, and an output, the first input coupled to a first reference voltage, and the second input coupled to the brownout terminal; a second comparator defining a first input, a second input, and an output, the first input of the second comparator coupled to a second reference voltage, and the second input of the second comparator coupled to the brownout terminal; a logic circuit defining a first input, a second input, and an output, the first input of the logic circuit coupled to the output of the first comparator, and the second input of the logic circuit coupled to the output of the second comparator; and a current source coupled to the brownout terminal and configured to be enabled by the output of the logic circuit.

4. The power conversion circuit of claim 2, wherein the logic circuit includes an AND gate.

5. A controller for a power conversion circuit, comprising: brownout terminal, the controller configured to receive an input signal on the brownout terminal, the input signal proportional to an input voltage to the power conversion circuit; a gate terminal, the controller configured to drive a gate signal for a primary side field effect transistor (FET) on the gate terminal; a feedback terminal, the controller configured to receive a feedback signal indicative of an output voltage on the feedback terminal; a first circuit having an input coupled to the brownout terminal, and the first circuit configured to: sense the input signal on the brownout terminal while refraining from driving an alarm current to the brownout terminal; assert an internal signal if the input signal sensed on the brownout terminal during the refraining falls outside a predetermined range; and drive an indicator signal out of the brownout terminal responsive to the assertion of the internal signal of the controller.

6. The controller of claim 5, wherein the first circuit further comprises:
   a first comparator including a first input coupled to a first reference voltage, and a second input coupled to the brownout terminal;
   a second comparator including a first input coupled to a second reference voltage, and a second input coupled to the brownout terminal;
   a logic circuit including a first input coupled to an output of the first comparator, and a second input coupled to an output of the second comparator; and
   a current source coupled to the brownout terminal and enabled by an output of the logic circuit.

7. The controller of claim 5, wherein the first circuit further comprises:
   an oscillator;
   a logic circuit including a first input coupled to an output of the oscillator;
   a current source coupled to the brownout terminal and enabled by an output of the logic circuit; and
   a comparator including a first input to a reference voltage, a second input coupled to the brownout terminal, and an output coupled to a second input of the logic circuit.

8. The controller of claim 7, wherein the logic circuit includes an AND gate.

9. A method of operating a switch-mode power supply, comprising: driving, by a controller a gate signal to a field effect transistor (FET) on a primary side of the switch-mode power supply; sensing, by the controller, a value indicative of the input voltage on an input terminal of the controller, and simultaneously refraining from driving an alarm current to the input terminal of the controller; asserting an internal signal of the controller if the value indicative of the input voltage sensed on the input terminal falls outside a predetermined range; and driving, by the controller, the alarm current to an external indicator connected to the input terminal of the controller in response to the assertion of the internal signal of the controller.

10. The method of claim 9, wherein driving the alarm current further comprises driving the alarm current off and on at a rate set by an oscillator of the controller.

11. The method of claim 9, wherein asserting the internal signal further comprises monitoring the value indicative of input voltage at the input terminal using a comparator with a reference voltage.

12. The method of claim 9, wherein the external indicator is a human perceivable indicator.

* * * * *

UNITED STATES PATENT AND TRADEMARK OFFICE
CERTIFICATE OF CORRECTION

PATENT NO. : 10,141,735 B2
APPLICATION NO. : 15/193460
DATED : November 27, 2018
INVENTOR(S) : Christophe Basso and Stephanie Cannenterre Page 1 of 1

It is certified that error appears in the above-identified patent and that said Letters Patent is hereby corrected as shown below:

In the Claims

Column 11,
Claim 1., Line 40, "form" should be --from--
Claim 2., Line 45, add the word --and-- after the words "a second input,"
Claim 2., Line 56, add the word --when-- after the word "wherein"

Column 12,
Claim 5., Line 11, add the word --a-- before the word "brownout"
Claim 9., Line 56, delete the word "the" after the word "of"

Signed and Sealed this
Twenty-ninth Day of January, 2019

Andrei Iancu
*Director of the United States Patent and Trademark Office*